Figure 1:
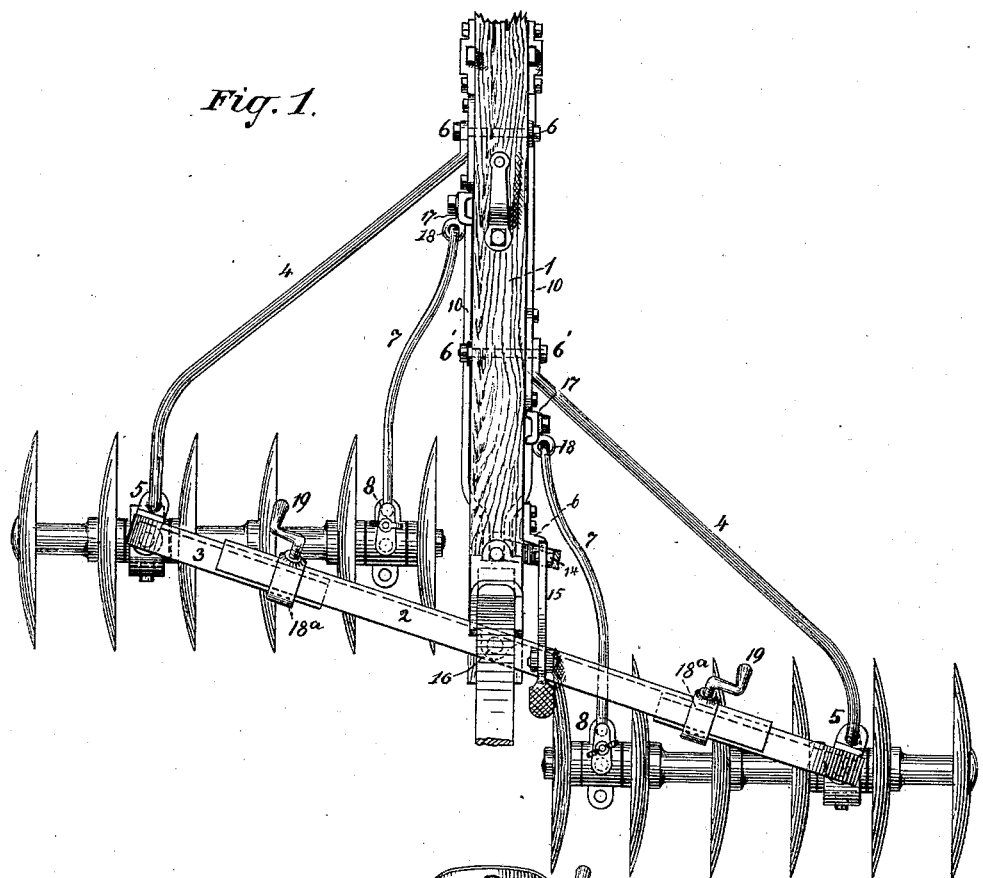

(No Model.) 3 Sheets—Sheet 1.

A. G. HILL.
HARROW.

No. 431,351. Patented July 1, 1890.

Witnesses
John Becker

Inventor
Andrew George Hill (No Model.) 3 Sheets—Sheet 2.

A. G. HILL.
HARROW.

No. 431,351. Patented July 1, 1890.

Witnesses
John Becker

Inventor
Andrew George Hill (No Model.) 3 Sheets—Sheet 3.
A. G. HILL.
HARROW.
No. 431,351. Patented July 1, 1890.
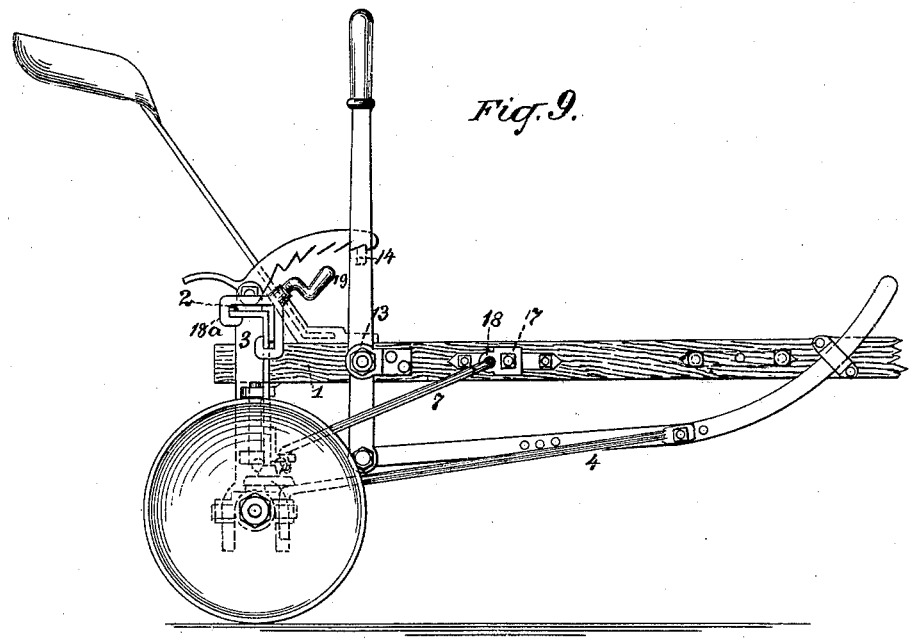
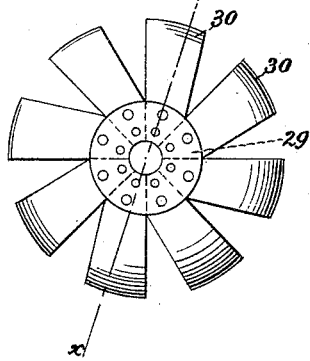
Witnesses
Inventor
Andrew George Hill

UNITED STATES PATENT OFFICE.

ANDREW GEORGE HILL, OF STERLING, ILLINOIS, ASSIGNOR TO THOMAS A. GALT AND GEORGE S. TRACEY, BOTH OF SAME PLACE.

HARROW.

SPECIFICATION forming part of Letters Patent No. 431,351, dated July 1, 1890.

Application filed February 15, 1889. Serial No. 299,989. (No model.)

*To all whom it may concern:*

Be it known that I, ANDREW GEORGE HILL, of the city of Sterling, Illinois, have invented certain new and useful Improvements in Disk Harrows; and I do hereby declare that the following is a full, clear, and exact description thereof, reference being had to the accompanying drawings Disk harrows as heretofore constructed have disk-gangs which are moved by means of a lever in order to change the angle of the disk-gangs, to which lever the disk-gangs are directly connected by means of draw-bars, such disk-gangs having motion in both horizontal and vertical planes. By reason of my invention the position of the disk-gangs can be changed so as to be operated one in advance of the other. The position of the disk-gangs can also be changed to a "reversed form"—that is to say, so arranged relatively to each other that the soil will be thrown outwardly from the center of the implement instead of inwardly. The same harrow is thus given the capacity of three implements. These positions are what I term, first, the "seeder" form; second, the "diagonal" form, and, third, the "reversed" form.

My improvements therefore consist, first, in the combination of a tongue, a cross beam or frame, and disk-gangs having motion at a point intermediate the ends of such gangs in both horizontal and vertical planes, said cross beam or frame being so adjustable to the tongue and the braces to the tongue and sliding bars connected therewith as to permit of the disk-gangs being operated one in advance of the other; second, in the combination of a tongue, a cross beam or frame, and disk-gangs having motion at a point intermediate the ends of such gangs in both horizontal and vertical planes, said disk-gangs being so adjustable to the cross beam or frame that the said disk-gangs may be used to throw the soil inwardly or outwardly, as desired; third, in the combination of a tongue, a cross beam or frame with disk-gangs having motion at a point intermediate the ends of such gangs in both horizontal and vertical planes, and so adjustable to said cross beam or frame that the said disk-gangs may be used to throw the soil either inwardly or outwardly, as desired, with braces adjustable to the tongue and sliding bars or frame connected therewith for operating said disk-gangs; fourth, in the combination of a tongue, cross-beam, disk-gangs having motion at a point intermediate the ends of such gangs in both horizontal and vertical planes, and sliding bars or frame mounted upon the tongue and having forward and backward and simultaneously upward and downward movement by means of a lever placed at or near the rear end of said tongue for the purpose of operating the disk-gangs; fifth, in the combination of a tongue, cross-beam, disk-gangs having motion in both horizontal and vertical planes, sliding bars or frame operated by a lever on the tongue, and long and short braces having interchangeable connections with the disk-gangs; sixth, in the arrangement of reversible loop-plates on the sliding bar, to which the short braces are connected to vary the height of the braces; also, in certain other combinations and arrangements of the instrumentalities hereinafter described.

Figure 2:
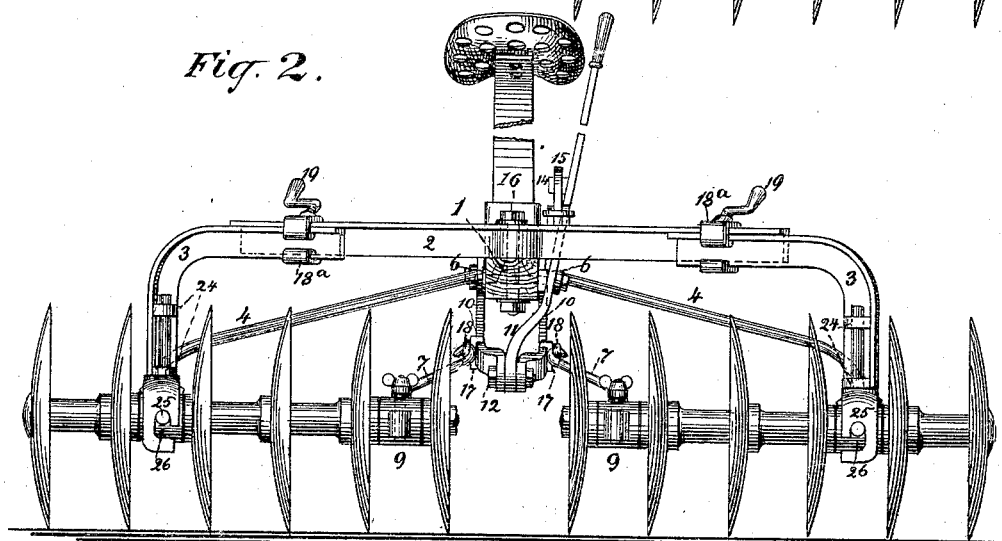
Figure 3:
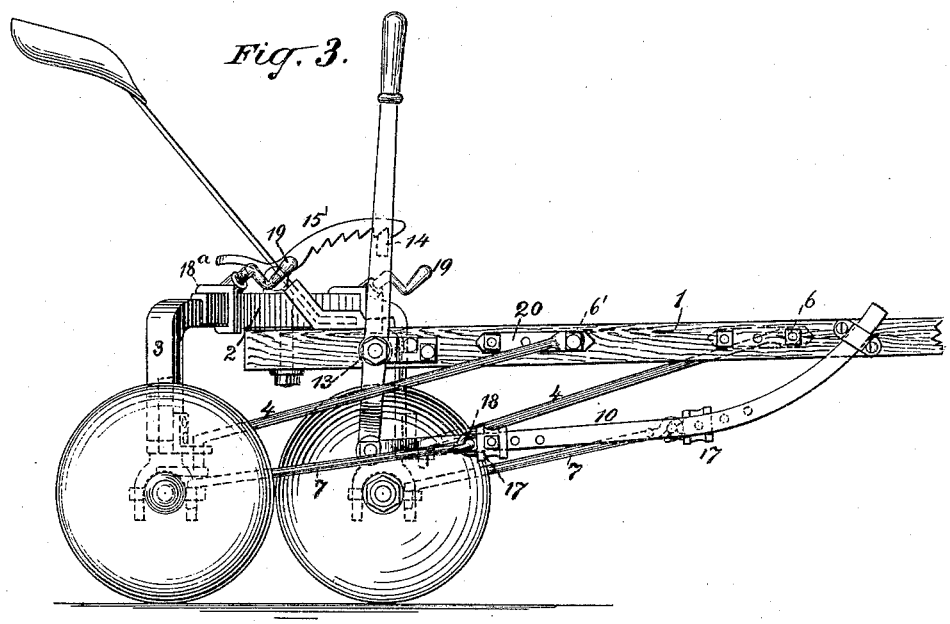
Figure 5:
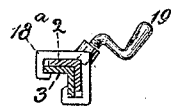
Figure 8:
Figure 4:
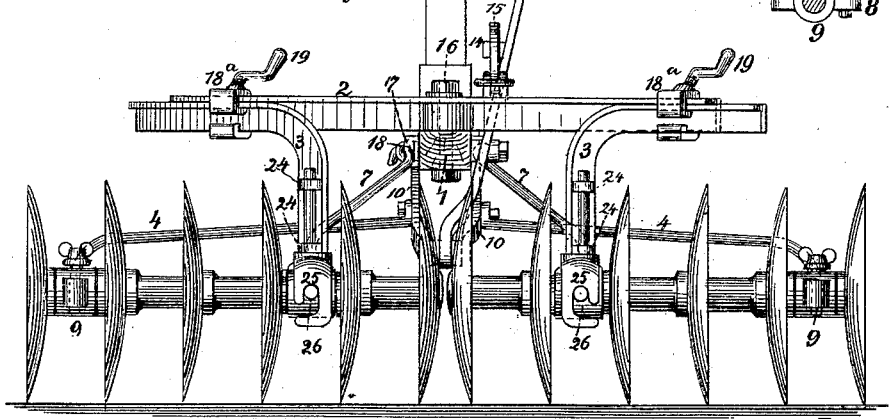
Figure 6:
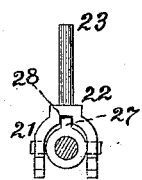
Figure 7:
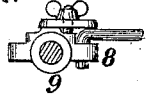

In the drawings, Figure 1 is a plan view of a harrow containing my improvements, the same being shown when the parts are shifted so that the disk-gangs are in the diagonal position. Fig. 2 is a rear elevation of the harrow containing my improvements, the same showing the position of the parts when shifted so that the gangs are in the seeder position, the disk-gangs being in a line with each other, as when the harrow is run into or off the field. Fig. 3 is a side elevation of the harrow, the parts having been shifted to the diagonal form, as in Fig. 1. Fig. 4 is a rear view showing the harrow when the disk-gangs are shifted in position and with the connections of the braces correspondingly reversed—that is, giving the "reversed" form, so called. Fig. 5 is a detail view of one of the clamps for connecting the down-hangers to the cross-beam. Fig. 6 is a detail view and cross-section at one of the universal joints or point at which the down-hanger grasps the axle of the disk-gang. Fig. 7 is a detail view and cross-section of one of the thimbles containing lug, in which is inserted the rear end of one of the braces. Fig. 8 is a perspective view of the reversible loop or plate placed on the sliding bars or frame on the seeder and diagonal forms, and which is tranferred to the tongue when the harrow is changed to the reversed form, and into the loops of which are secured the hook-shaped ends of the short braces. Fig. 9 is a side elevation of the harrow when changed to the reversed form. Fig. 10 is a plan view of my improvement in the disk. Fig. 11 is a transverse section of such disk, taken through the line $x\ x$ of Fig. 10.

1 is the tongue.

2 is the cross beam or frame, to which the disk-gangs are connected through the down-hangers 3 3. These disk-gangs are secured to the down-hangers by means of the universal joints on the axles of the disk-gangs, so that the disk-gangs may have vibratory motion in both vertical and horizontal planes to readily adapt themselves to the inequalities of the ground on which they are operated, in manner as heretofore practiced with harrows of this class. When in the seeder or diagonal form, the long braces 4 4 are connected at their rear ends, bent in hook shape to the disk-gangs by being hooked into the loops 5 5, riveted onto the lower portion of the down-hangers. The forward ends 6 6 of these long braces have eyes and are connected to the tongue by bolts passing through such eyes and the tongue. The short braces 7 7, when the harrow is in the same two positions stated, have their rear ends also of hook shape hooked into the lugs 8 8, cast on the boxes 9 9, placed between the last two disks of each disk-gang. (See Fig. 7.) The front ends of said short braces, also of hook shape, are connected to the two slide-bars 10 10, being inserted into the loops of the reversible loop-plates, which plates are temporarily secured to the slide-bars, as hereinafter specified. These slide-bars are moved by a lever 11, which is connected to and supports their rear ends by the bolt 12. The forward ends of these slide-bars pass up, one on each side of the tongue 1, being supported by oblique guides on the tongue, Fig. 3. The lever 11 is pivoted at 13 to the tongue and has a dog 14, which dog works into a rack 15, rigidly secured to the cross-beam. The lower end of this lever is pivoted to the slide-bars 10 10 at their rear ends. By reason of these slide bars or frame 10 10 being interposed between the lever and the braces which connect them with the disk-gangs the harrow is given the capacity of three implements. The slide-bars can be made of one solid bar, so as to have its slide movement entirely beneath the tongue working through staples, and in small harrows it would be desirable to so construct these parts, as I have found in practice. The operation, however, is the same. It will readily occur to any one skilled in the art that various forms may be given to this part of my invention without departing from its principle. For instance, a cast metal slide may be mounted upon ways above or beneath the tongue or frame and connected with the lever by an intermediate strap or link. Lugs or loops for attaching the braces may be cast integral with such slide wherever desired.

An important object which I accomplish by mounting the slide-bars as shown in Fig. 3 is that it furnishes an efficient and self-acting means for elevating the front ends of the draft-rods. It is well known that in working a disk harrow the sharper the angle of the gang is the greater the tendency of the forward disks is to "dig" into the ground. If a harrow with a driver runs level at a medium angle, it will not run level if the angle is increased. Now I overcome this by the slide-bars, which are made to elevate the front ends of the rods, so that the sharper the angle the higher the rods are raised. It will be observed that I attach the lever so that when the gangs are straight the lever is perpendicular. At once when the lever is moved back the slide-bars are elevated by it at the rear end, the front end at the same time moving upwardly in the oblique guides on the tongue, so that in adjusting the angle of the gangs the draft-bars are automatically moved into the desired corresponding position and the proper action of the disks maintained.

The cross beam or frame 2 is made adjustable by being pivoted to the tongue by means of the bolt 16 at or near the rear end of the tongue. On this bolt the cross-beam 2 is made to swing in order to bring the disk-gangs into the diagonal form, as shown in the plan view, Fig. 1. The forward ends of the long braces 4 4 are then secured to the pole at different points—namely, one, that of the left-hand disk-gang, by the bolt 6 6 at a point a little in advance of where it was previously secured, and the other for the right-hand disk-gang by the bolt 6' 6' a little to the rear of where it was previously secured. The short braces 7 7 are likewise shifted along the slide-bars 10 10, the one connected to the right-hand disk-gang a little to the rear of its former position and the other connected to the left-hand disk-gang a little in advance of its former position.

17 17 are the reversible plates, on each of which is cast a loop 18, into which loop the short braces 7 7 are hooked. These plates 17 17 are of the same width, as the bars 10 10 are channeled out and have four short corner projections, so that they will slide along the slide-bars to be fastened at any desired point, and capable of being reversed or taken off and shifted to the tongue, as hereinafter described. The loops 18 18 can thus be shifted to above the slide-bars 10 10, so as to bring the front ends of the braces connected to the bars higher, if necessary, to counteract the increased weight of a driver in his seat, and thus to overcome and regulate the tendency of the inner ends of the disk-gangs to sink into the soil. Various forms may be given to this loop-plate, by which the braces may be raised at their forward ends—as, for instance, several loops may be attached to a plate at varying heights—thereby obviating the necessity of reversing the plate upon the bar. The upward movement of the slide-bars 10 10 is permitted by this capacity of adjustment, and thereby causing all of the disks of the gangs to cut to an equal depth in the soil.

The cross-beam 2 and the down-hangers 3 3 are constructed of angle-iron, preferably, but may be of wood, with some slight modifications, and are secured together by means of the clamping-irons 18$^a$ 18$^a$, (see Fig. 5,) the parts being clamped together by means of the hand-screws 19 19. While preferring this construction, I do not confine myself to it, as a wooden beam may be used, with any preferred style of hanger-holes being provided in the beam for attaching the hangers thereto by ordinary bolts in any of the three positions desired.

In changing the harrow from the seeder to the reversed form the down-hangers 3 3 are removed from the cross-beam 2 by releasing the clamps connecting the parts together, the right-hand disk-gang being shifted over to the left side of the tongue and the left-hand disk-gang to the right-hand side of the tongue without turning the disk-gangs around. Thus shifted the disks of the gangs will present outwardly from the center of the tongue on each side concave, instead of convex, surfaces, thus causing the soil in the operation of the harrow to be thrown outwardly instead of inwardly, as in the case of the seeder and diagonal forms. The down-hangers 3 3 are then again clamped to the cross-beam 2, but upon opposite sides, and, as it were, back to back. The rear hook-shaped ends of the long braces 4 4 are then hooked into the eyes on the lugs of the boxes 9 9, from which had been previously removed the rear hooked ends of the short braces 7 7. The rear ends of the braces 7 7 are then hooked into the eyes of the down-hangers. The forward ends of the long braces 4 4 are in this instance attached to the slide bars or frame 10 10, instead of to the tongue, and the forward ends of the short braces 7 7 are attached to the tongue by being connected to the loop 18 of the slide-plate 17, it being bolted on. These reversible slide-plates, which were previously attached to the slide-bars 10 10, are now bolted to two plates 20 20, rigidly secured to the tongue—one on each side—as seen in Figs. 3 and 9. The forward ends of the long braces 4 4, which had been disconnected from the pole and now connected to the slide bars or frame 10 10, as above stated, should each be secured loosely by means of a double nut, in order to enable them to rise and fall with the disk-gangs. In this position of the parts the short braces 7 7 are used to brace the down-hangers and the long braces 4 4 to shift the gangs. This is just the reverse of the use of these elements as seen in the seeder and diagonal forms.

The universal joint, by means of which the disk-gang is grasped by the down-hanger, so as to give the disk-gang free movement in both horizontal and vertical direction, is here constructed in a novel manner. To the down-hanger 3 is connected a swivel 21, whose shoulder 22 abuts against the lower portion of the down-hanger, the spindle 23 of the swivel passing through and having bearings in two flanges 24 24. The lower portion of the swivel is bifurcated, having two bayonet-joints 25 25, into which pass the trunnions 26 26. These trunnions project from out of one of the boxes on the axle of the disk-gang. At the upper portion of this box is a vertical trunnion 27, which works in a slot 28 of the swivel. (See Fig. 6.) This is a simple construction for obtaining movement in both horizontal and vertical directions on the axle of the disk-gang. It also permits of a ready attaching to or detaching from the down-hanger of the disk-gang.

My improved disk is constructed as follows: 29 is a concave plate, through the center of which the axle of the disk-gang passes. To this disk is riveted a number of radial blades partaking of the curvature of the said center. These blades when so attached leave angular spaces between them. (See Figs. 10 and 11.) The whole contour of the disks, however, is the same as the ordinary disk. The center of the disk may be flat instead of concave without departing from the principle of my invention in this part of the improved harrow. The object of this construction is to give cutting-edges in working on the soil, thus more thoroughly pulverizing it. The disks are also readily freed from clogs on the changing of the angle of the disk-gangs, particularly when working in heavy or wet soils.

On each of the boxes 9 9, I place an oil-cup 30, which can be screwed down to the top of the box by a thumb-screw 31. This oil-cup extends outward, so that its lip or extension will rest on the top of the inner end of the brace, in order to hold the brace securely in the lug 8.

32 is the driver's seat placed in a socket on the pole and secured thereto in the usual manner.

I claim—

1. The combination of a tongue, a cross beam or frame, and disk-gangs having motion at a point intermediate the ends of such gangs in both horizontal and vertical planes, said cross beam or frame being adjustable to the tongue and the braces to the tongue, and sliding bars connected therewith to permit of the disk-gangs being operated one in advance of the other and in parallel planes, substantially as described.

2. The combination of a tongue, a cross beam or frame, with disk-gangs having motion at a point intermediate the ends of such gangs in both horizontal and vertical planes, and adjustable to said cross beam or frame so that the said disk-gangs may be used to throw the soil either inwardly or outwardly, as desired, and operated one in advance of the other and in parallel planes, substantially as described.

3. The combination of a tongue, a cross beam or frame, disk-gangs having motion at a point intermediate the ends of such gangs in both horizontal and vertical planes, and adjustable to said cross beam or frame so that the said disk-gangs may be used to throw the soil either inwardly or outwardly, as desired, with braces adjustable to the tongue, and sliding bars or frame connected therewith for operating said disk-gangs and securing said gangs one in advance of the other and in parallel planes, substantially as described.

4. The combination of a tongue, cross-beam, disk-gangs having motion at a point intermediate the ends of such gangs in both horizontal and vertical planes, and sliding bars or frame mounted upon the tongue, and having forward and backward motion by means of a lever placed at or near the rear end of said tongue for the purpose of operating the disk-gangs and raising or lowering them simultaneously with changing their angle, substantially as described.

5. The combination of a tongue, cross-beam, disk-gangs having motion in both horizontal and vertical planes, sliding bars operated by a lever on the tongue, and long and short braces having interchangeable connections with the disk-gangs, substantially as described.

6. The combination, with the sliding bar and the short braces, of the adjustable loop-plates, arranged substantially as described, whereby the height of the braces is varied, as and for the purpose set forth.

7. In a disk harrow, the combination of a down-hanger and disk-gang with the bayonet-joint swivel, substantially as described.

8. In a disk harrow, the lever 11 and the slide-bars 10 10, together pivoted at their rear ends to the lower part of the lever, and at their upwardly-curved front ends working in oblique guides on the tongue, in combination with the disk-gangs, mounted substantially as described.

9. An oil-cup with a lip or extension, in combination with the box on the axle of the disk-gang for holding the brace securely to the box, substantially as described.

10. The combination, with the tongue, the cross-beam pivoted thereto, and the two disk-gangs mounted on the beam, of the braces pivoted to the gang-bearings and adjustably secured to the tongue, substantially as set forth.

11. The combination of the tongue, the cross-beam pivoted thereto, and the two disk-gangs mounted on the beam of the outer braces pivoted to the gang-bearings and adjustably secured to the tongue, the sliding frame, and the inner braces adjustably secured to the frame and to the gangs, substantially as described.

12. The combination, with the disk-gangs and their inner braces, of the lever and the sliding frame moved thereby forward or backward and simultaneously raised or lowered, respectively, substantially as and for the purpose set forth.

13. The combination of the disk-gangs and their inner braces, of the tongue, the lever pivoted thereto, and the sliding frame suspended at its rear end on the lever and supported at its front upwardly-curved end on guides on the tongue, substantially as described.

14. The combination of the tongue, the cross-beam pivotally mounted thereon, and the opposite disk-gangs each connected near one end by a universal joint to the cross-beam and at its other end horizontally and vertically adjustable, substantially as described.

15. The tongue and the disk-gang beam pivotally mounted thereon and having at its ends down-hangers supporting one end of the disk-gang shafts, in combination with the disk-gangs, the lever and slides, and the braces connecting the free ends of the gangs to the slides, substantially as described.

ANDREW GEORGE HILL.

Witnesses:
T. E. BISSELL,
W. G. ROBINSON.